(12) United States Patent
Walsh et al.

(10) Patent No.: US 9,060,039 B2
(45) Date of Patent: Jun. 16, 2015

(54) DYNAMIC STUNT CARDS USING USER DEVICE DISPLAYS

(71) Applicants: Verizon New Jersey Inc., Newark, NJ (US); Verizon Patent and Licensing Inc., Basking Ridge, NJ (US)

(72) Inventors: Jeffrey M. Walsh, Verona, NJ (US); Woo Beum Lee, Basking Ridge, NJ (US); Michelle Felt, Randolph, NJ (US)

(73) Assignees: VERIZON PATENT AND LICENSING INC., Basking Ridge, NJ (US); VERIZON NEW JERSEY INC., Newark, NJ (US)

( * ) Notice: Subject to any disclaimer, the term of this patent is extended or adjusted under 35 U.S.C. 154(b) by 268 days.

(21) Appl. No.: 13/772,789

(22) Filed: Feb. 21, 2013

(65) Prior Publication Data

US 2014/0237043 A1   Aug. 21, 2014

(51) Int. Cl.
*H04L 29/06* (2006.01)
*A63G 31/00* (2006.01)

(52) U.S. Cl.
CPC .................. *H04L 65/403* (2013.01)

(58) Field of Classification Search
CPC ..... G06F 3/0484; H04L 51/04; H04L 65/403; H04M 1/72544; H04N 2005/4408
USPC ........... 709/204, 206–207; 704/276; 348/157; 455/566; 340/12.54; 705/5; 725/133, 725/80
See application file for complete search history.

(56) References Cited

U.S. PATENT DOCUMENTS

| | | | |
|---|---|---|---|
| 2005/0170318 A1* | 8/2005 | Yeomans | 434/81 |
| 2011/0263342 A1* | 10/2011 | Baldwin et al. | 472/57 |
| 2012/0105466 A1* | 5/2012 | Leslie | 345/589 |
| 2014/0101189 A1* | 4/2014 | Schenkel | 707/758 |
| 2015/0012308 A1* | 1/2015 | Snyder | 705/5 |

OTHER PUBLICATIONS

"Card Stunt," from Wikipedia, printed Feb. 9, 2015.*

* cited by examiner

*Primary Examiner* — Alina N Boutah (57) ABSTRACT

A server device may receive one or more event instruction schedules. Each of the one or more event instruction schedules may identify one or more events and corresponding instructions. The server may receive location information identifying a location of a user device; identify a particular schedule of the one or more event instruction schedules based on the location; identify an occurrence of an event of the one or more events identified by the particular schedule; identify a particular corresponding instruction for the event; and direct the user device to execute the corresponding instruction based on the occurrence of the of the one or more events. The server device may cause the user device to execute the corresponding instruction to function as a component in a combined display or in a combined sound outputting system having multiple user devices in addition to the user device.

25 Claims, 9 Drawing Sheets

Fig. 7

DYNAMIC STUNT CARDS USING USER DEVICE DISPLAYS

BACKGROUND

Patrons of a venue (e.g., a stadium, an arena, a theater, etc.) sometimes position a series of stunt cards to display a pattern or logo when the stunt cards are viewed from a bird's-eye view or some other angle of view. Stunt cards may be physical cards that are distributed by venue vendors. Each stunt card may be part of a mosaic and may have a portion of the pattern or logo such that the entire pattern or logo may be constructed when the stunt cards are positioned together. Stunt cards may be cumbersome to distribute and may be cumbersome for patrons to manage. Further, stunt cards may limit the number of patterns or logos that may be constructed (e.g., different sets of stunt cards may be required to construct different patterns or logos).

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may permit a user device to function as a stunt card. For example, multiple user devices may be arranged together to form a combined display such that each user device may function as an individual group of pixels in the combined display. In some implementations, the multiple user devices may each display a portion of a pattern such that when the multiple user devices are positioned together, the multiple user devices may display the pattern when corresponding displays of the multiple user devices are viewed from a bird's-eye view, an isometric view, or some other angle of view. In some implementations, a single user device may be used to display different portions of different patterns, thereby allowing the user device to function as a dynamic stunt card.

Figure 1:
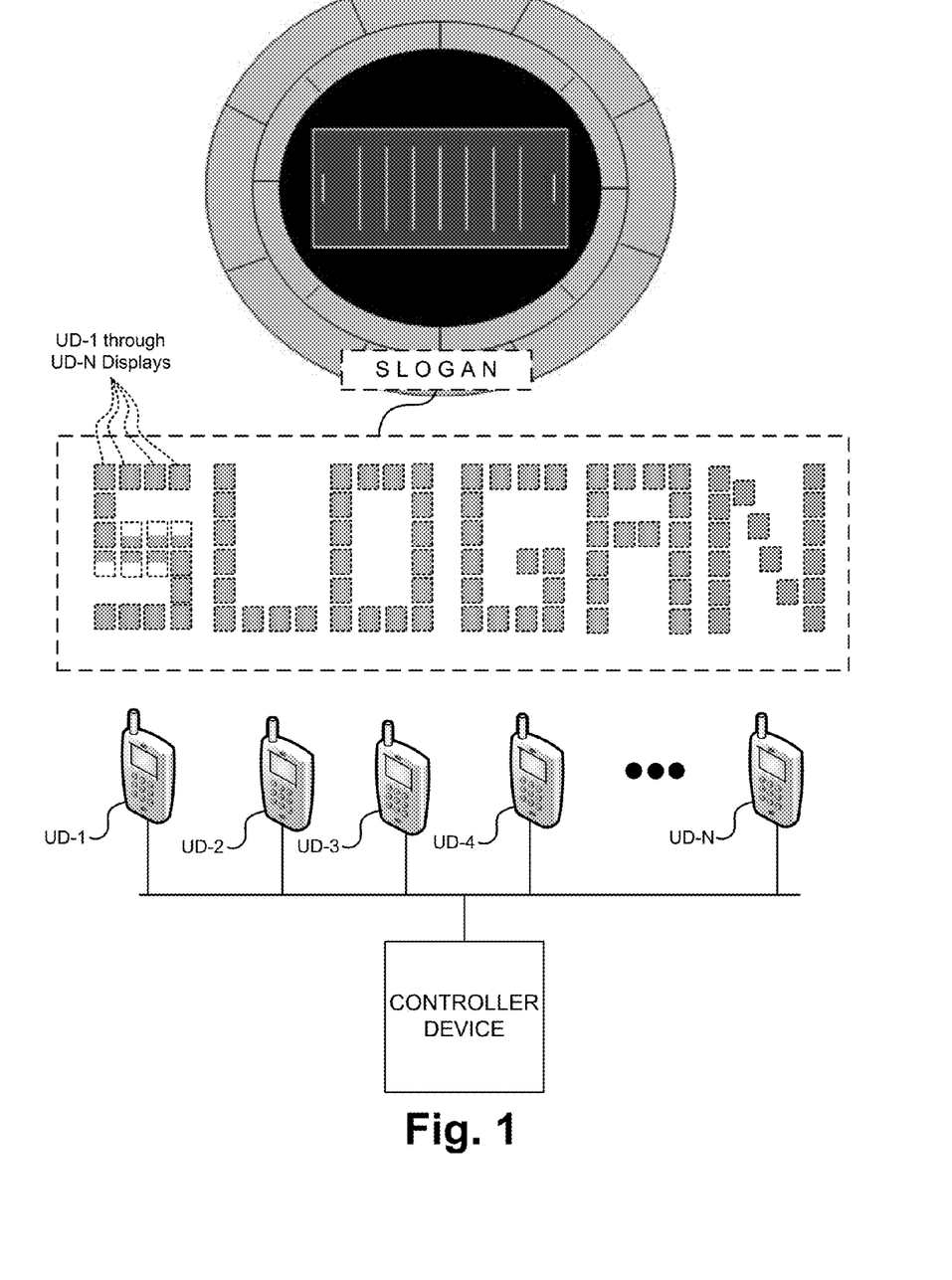
FIG. 1 illustrates an example overview of an implementation described herein.

FIG. 1 illustrates an example overview of an implementation described herein. In FIG. 1, assume that multiple user devices (e.g., UD-1 through UD-N, where N>1) are located in a particular section of a venue, such as a stadium. As shown in FIG. 1, each of UD-1 through UD-N may display a portion of a pattern, such as the word "SLOGAN." In some implementations, the pattern may include a word, a team logo, an advertisement logo, etc., and may have a particular color or design. In some implementations, portions of the pattern may be broadcasted to UD-1 through UD-N. In some implementations, a controller device may communicate with each of UD-1 through UD-N to direct each of UD-1 through UD-N to display a corresponding portion of the pattern.

In some implementations, the controller device may determine an event instruction for a particular user device and may cause the user device to execute the event instruction (e.g., via an application executing on the user device). The event instruction, for example, may be based on a location of the user device (e.g., based on a seat identifier with which a user of the user device is associated) and may cause the user device to display a portion of a pattern at a particular time.

Additionally, or alternatively, the event instruction may cause the user device to play an audio file, play a video file, record video from a camera of the user device, trigger a flashlight on the user device, cause the display of the user device to blink in a particular manner, display a particular color, or perform some other task via the user device. In some implementations, the event instruction may be executed by the user device based on the occurrence of a particular event (e.g., particular time of day, a time-out period at a sports game, a scoring event at a sports game, a set change at a concert, a song change at concert, etc.).

As described above, the user device may be used to display different portions of different patterns, thereby allowing the user device to function as a dynamic stunt card. For example, the user device may be part of a collection of user devices that form a combined display such that each user device functions as a single pixel or group of pixels of the combined display. As a result, a patron's experience, interaction, involvement and/or loyalty may be improved when the patron attends a particular event (e.g., a sports game, a concert, etc.) and when the patron uses a user device as part of a combined display. Further, the user device may replace a physical stunt card, thereby reducing costs, associated with the physical stunt card, and eliminating inconveniences caused by the physical stunt card.

Figure 2:
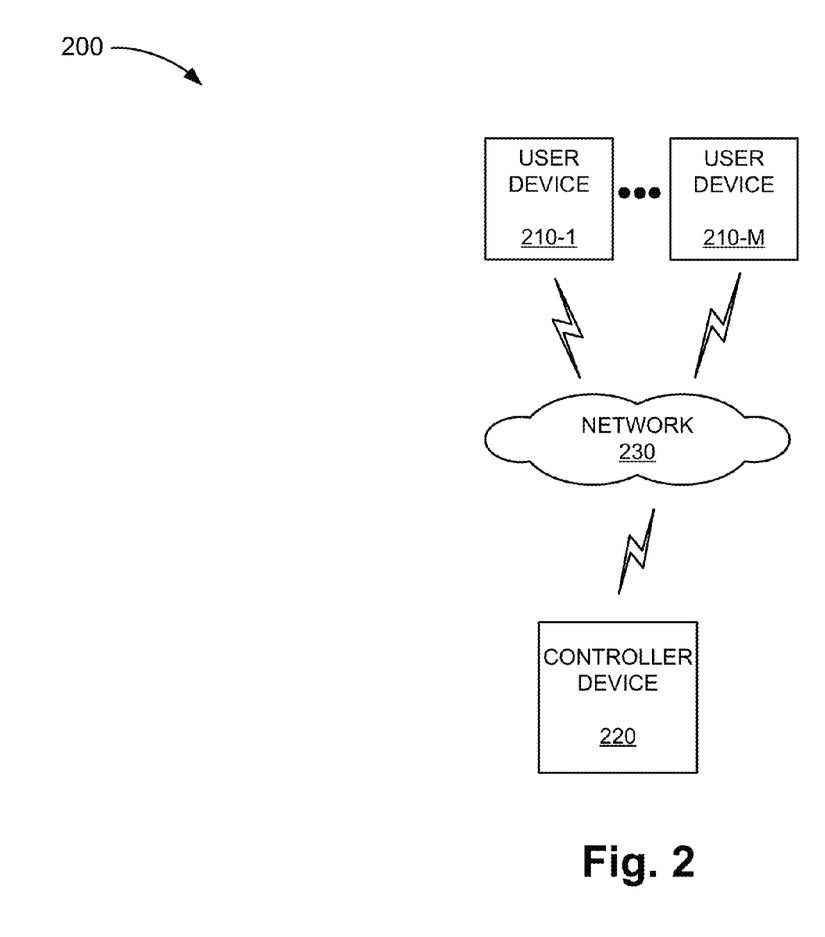
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1, . . . , 210-M (where M≥1), controller device 220, and network 230.

User device 210 may include a portable device capable of communicating via a network, such as network 230. For example, user device 210 may correspond to a mobile communication device (e.g., a smart phone or a personal digital assistant (PDA)), a portable computer device (e.g., a tablet computer), or some other type of portable device. As described above, user device 210 may function as a dynamic stunt card to display a portion of a pattern, display an animation sequence, display an animation, play an audio file, play a video file, record video from a camera of the user device, trigger a flashlight, or perform some other function.

In some implementations, multiple user devices 210 may be arranged together to form a combined display such that each user device 210 may function as an individual pixel or a group of pixels in the combined display. In some implementations, a user of user device 210 may direct user device 210 to receive an application, used for executing event instructions, from a server storing the application. In some implementations, the application may run passively in the background of user device 210 while continuing to monitor and identify the occurrence of an event.

Controller device 220 may include one or more computing devices, such as a server device or a collection of server devices. In some implementations, controller device 220 may store information identifying an event and may cause user device 210 to execute a corresponding event instruction based on the occurrence of the event. In some implementations, controller device 220 may include a time-keeping function and/or a scoring function to determine the occurrence of the event (e.g., a time-out period during or a scoring event at a sports game, etc.). In some implementations, an operator of controller device 220 may manually direct user device 210 to execute a particular event instruction. In some implementations, controller device 220 may store a content file (e.g., a video content file, an audio content file, etc.) and may provide the content file to user device 210 (e.g., when the event instruction directs user device 210 to open the content file).

In some implementations, controller device 220 may be located in a venue where user devices 210 are located, or may be located external to the venue, such as in network 230. In some implementations, controller device 220 may be used to identify activity of a patron of a venue (e.g., a user of user device 210), for example, when the patron leaves a particular venue before an end time of a venue affair. In some implementations, venue personnel may use patron activity to modify events to improve the experience of a patron and/or to encourage a patron to attend a particular venue affair for a longer period of time.

Network 230 may include one or more wired and/or wireless networks. For example, network 230 may include a cellular network, a public land mobile network (PLMN), a second generation (2G) network, a third generation (3G) network, a fourth generation (4G) network, a fifth generation (5G) network, and/or another network. Additionally, or alternatively, network 230 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
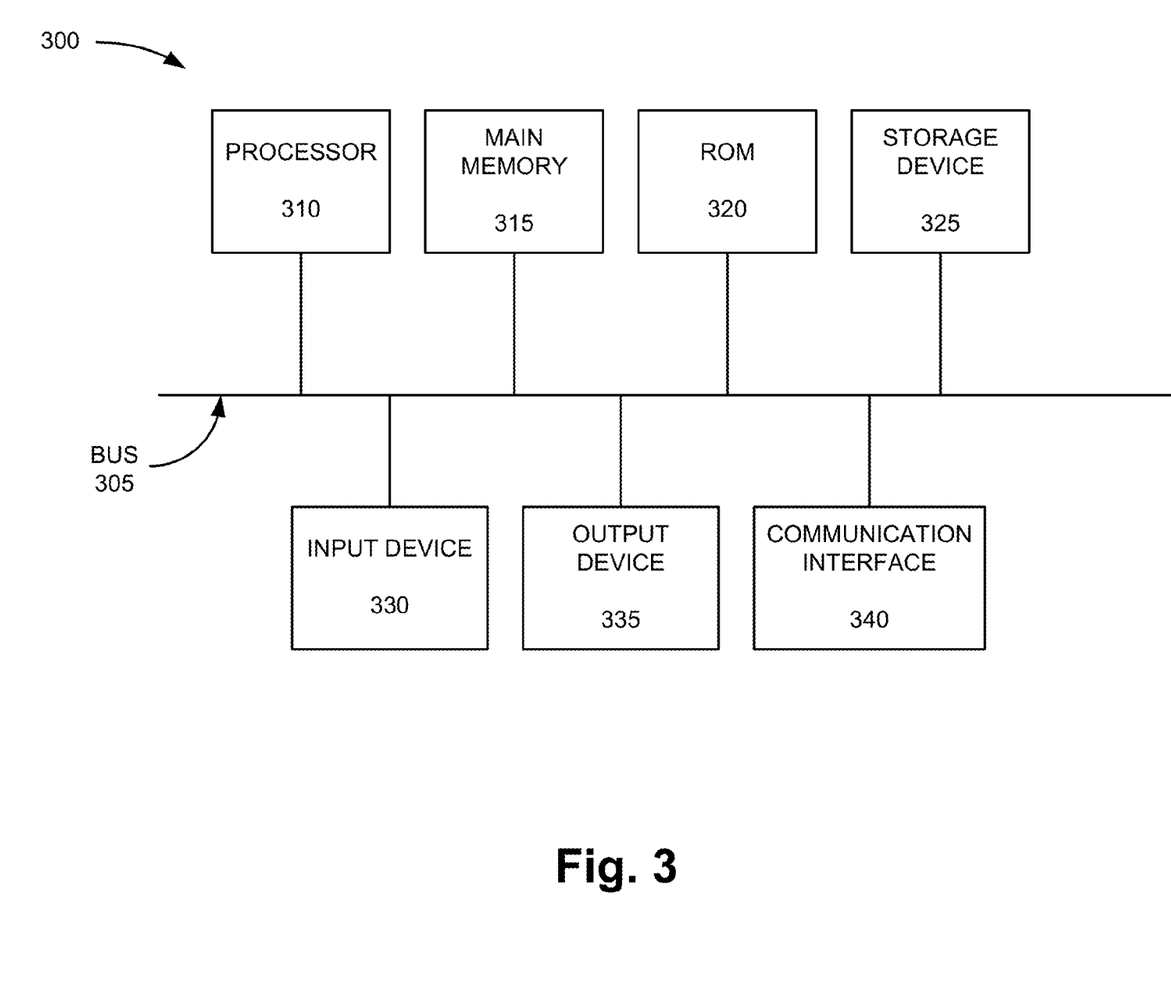
FIG. 3 illustrates example components of a device that may be used within the environment of FIG. 2.

FIG. 3 illustrates example components of a device 300 that may be used within environment 200 of FIG. 2. Device 300 may correspond to user device 210 and/or controller device 220. Each of user device 210 and/or controller device 220 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like mechanism that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
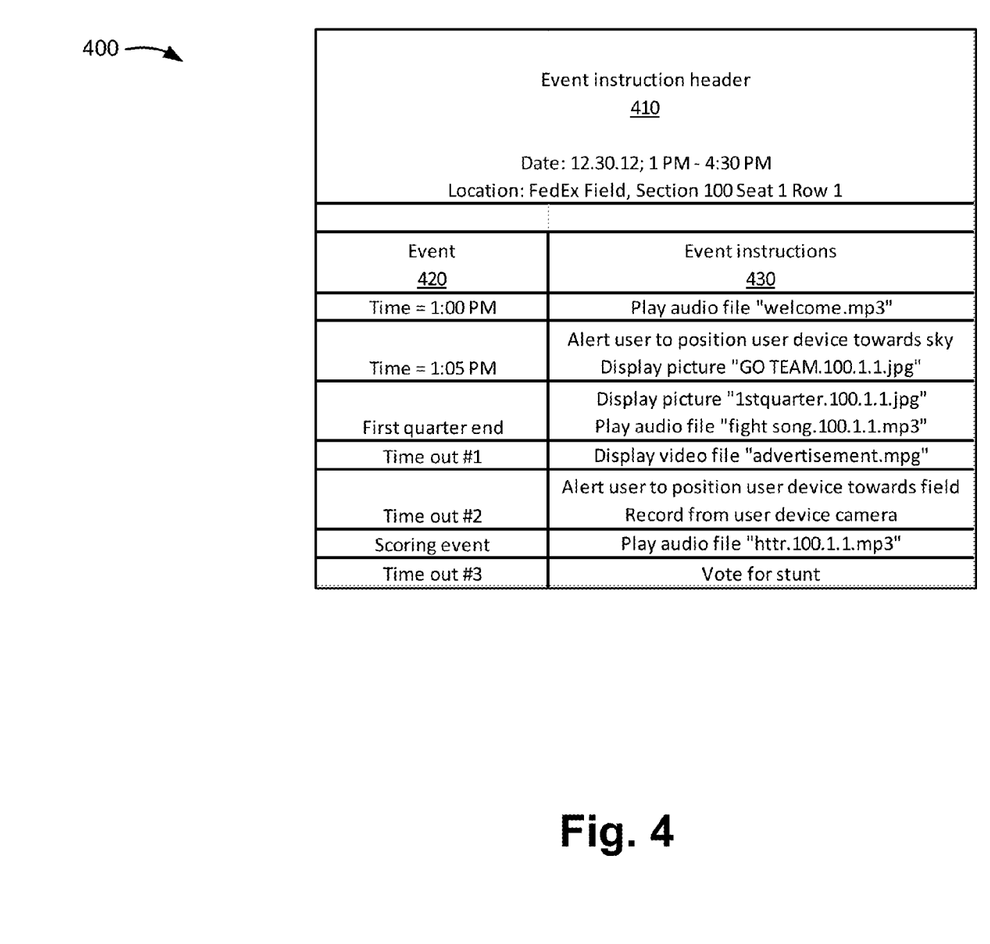
FIG. 4 illustrates an example data structure that may be stored by one or more devices in the environment of FIG. 2.

FIG. 4 illustrates an example data structure 400 that may be stored by one or more devices in environment 200. In some implementations, data structure 400 may be stored in a memory of controller device 220. In some implementations, data structure 400 may be stored in a memory separate from, but accessible by, controller device 220. In some implementations, data structure 400 may be stored by some other device in environment 200, such as user device 210.

A particular instance of data structure 400 may contain different information and/or fields than another instance of data structure 400. For example, one instance of data structure 400 may include information to identify a schedule of events and a set of corresponding event instructions for a first venue, whereas another instance of data structure 400 may include information to identify another set of events and another set of corresponding event instructions for a second venue.

As shown in FIG. 4, data structure 400 may include event instruction header field 410, event field 420, and event instructions field 430.

Event instruction header field 410 may store information used to identify a schedule of events and corresponding event instructions that user device 210 may execute based on the occurrence of an event. For example, as shown in FIG. 4, event instruction header field 410 may store a date, a time period, and information identifying a location (e.g., a particular venue and a particular seat identifier). In some implementations, controller device 220 may identify a particular schedule of events and corresponding event instructions for a particular user device 210 based on location information of user device 210. In the example shown in FIG. 4, data structure 400 may store information identifying a schedule of events and corresponding event instructions for a user device 210 that is (or will be) located at the venue "FedEx Field" in the seat identifier "section 100, seat 1, row 1" during the date/time of "12.30.12; 1 PM-4:30 PM."

Event field 420 may store information that identifies a particular event. For example, an event may relate to a particular time of day, a time-out period at a sports game, a scoring incident at a sports game, a cheering stunt at a sports game or concert, a set change at a concert, a song change at a concert, or the like. In some implementations, information stored by event field 420 may relate to an anticipated event (e.g., an anticipated chant or cheer at a sports game).

Event instructions field 430 may store information that identifies instructions that user device 210 may execute based on the occurrence of a corresponding event. In some implementations, event instructions field 430 may store an instruction to direct user device 210 to open a particular content file provided or identified by controller device 220 (e.g., an audio file, a video file corresponding to animation, an image file corresponding to portion of a pattern or simulated image, etc.) or to direct user device 210 to obtain the particular content file via a universal resource locator (URL). Additionally, or alternatively, event instructions field 430 may store an instruction to send a text message to user device 210. Additionally, or alternatively, event instructions field 430 may store an instruction to alert a user of user device 210 (e.g., via a text message) to position user device 210 in a particular manner (e.g., such that the display of user device 210 is visible from a particular angle of view). Additionally, or alternatively, event instructions field 430 may store an instruction to direct a user of user device 210 to vote for a particular event instruction (e.g., a particular pattern or image to be displayed, a particular song to be played, etc.). For example, the controller device 220 may direct user device 210 to display a portion of a particular pattern when a majority of multiple user devices 210 vote to display the particular pattern.

Additionally, or alternatively, event instructions field 430 may store an instruction to direct user device 210 to display information regarding a particular player at a sports game (e.g., when the player performs a particular action, such as scoring a point, or when the player is scheduled to perform an action, etc.). Additionally, or alternatively, event instructions field 430 may store an instruction to direct user device 210 to display an advertisement and/or a promotion for a product being sold by a nearby merchant. In some implementations, event instructions field 430 may store priority information to identify a particular event instruction that user device 210 may execute when the occurrence of multiple events happens at the same time. In some implementations, event instructions field 430 may store different instructions for different types of user devices 210 (e.g., one event instruction for a mobile phone device and another event instruction for a tablet computing device).

In some implementations, information stored by data structure 400 may be based on a schedule (e.g., a sports broadcasting schedule that identifies time-out periods, a manually inputted schedule received from an operator in real-time, a manually inputted scheduled received from an operator in advance of an event, and/or based on some other type of schedule). Additionally, or alternatively, information stored by data structure 400 may be based on a measure of popularity of an event instruction.

While particular fields are shown in a particular format in data structure 400, in practice, data structure 400 may include additional fields, fewer fields, different fields, or differently arranged fields than are shown in FIG. 4.

Figure 5:
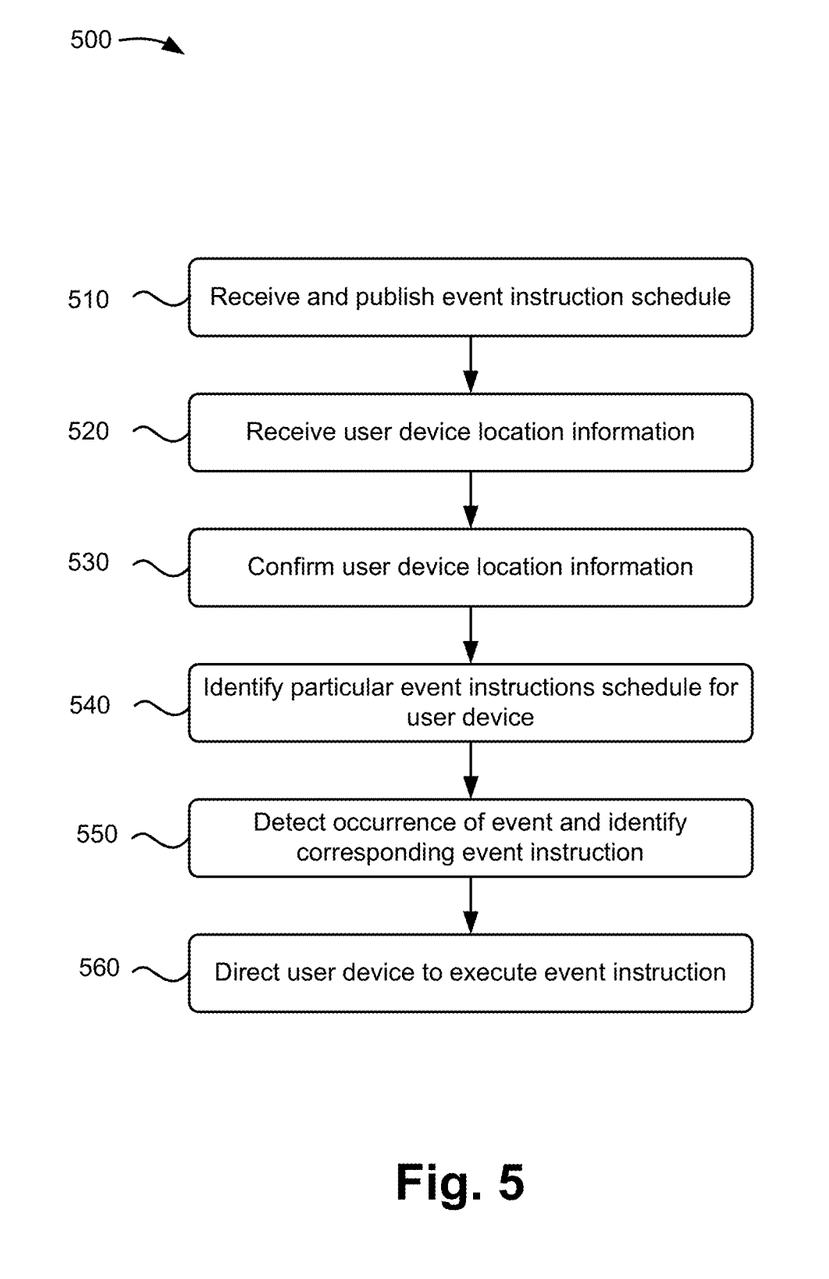
FIG. 5 illustrates a flowchart of an example process for causing a user device to execute a stunt card related event instruction.

FIG. 5 illustrates a flowchart of an example process 500 for directing user device 210 to execute a stunt card related event instruction. In one implementation, process 500 may be performed by one or more components of controller device 220. In another implementation, some or all of blocks of process 500 may be performed by one or more components of another device in environment 200 (e.g., user device 210), or a group of devices including or excluding controller device 220.

As shown in FIG. 5, process 500 may include receiving and publishing an event instruction schedule (block 510). For example, controller device 220 may receive the event instruction schedule from an operator and/or from a schedule provider associated with controller device 220 (e.g., an operator of device associated with a sports team or venue or a concert performer or venue, a licensee of the event instruction schedule, etc.). In some implementations, controller device 220 may publish the event schedule (e.g., on a web page) in a manner that allows a user of user device 210 to view and/or search multiple event schedules. For example, the user may use user device 210 to search the multiple event schedules to identify a particular seat identifier that is associated with a particular event instruction (e.g., to purchase a ticket for the particular seat identifier and/or to download content associated with the event instruction, such as an audio file, a video file, an image file, etc.).

Process 500 may also include receiving user device location information (block 520). For example, controller device 220 may receive location information from user device 210 when a user of user device 210 provides the location information via a user interface of user device 210 (e.g., using a "check-in" process when the user of user device 210 arrives at a particular venue at a particular time). For example, a user may input information identifying the particular venue and/or a seat identifier associated with the particular venue. Additionally, or alternatively, a user may scan a ticket (e.g., using a camera device of user device 210) that identifies the particular venue and/or the seat identifier. Additionally, or alternatively, user device 210 may provide the location information using a global positioning system (GPS) device of user device 210 that can be used to identify the particular venue and/or the seat. Additionally, or alternatively, user device 210 may provide the location information using some other technique.

Process 500 may further include confirming the user device location information (block 530). For example, controller device 220 may direct a user of user device 210 to confirm the user device location information. As an example, assume that the user of user device 210 inputs information identifying the venue and the seat identifier. Further, assume that a GPS device of user device 210 identifies that user device 210 is located in some other location that does not correspond to the information inputted by the user of user device 210 (e.g., when the user relocates to a different seat). Given these assumptions, controller device 220 may direct a user of user device 210 to confirm the user device location information (e.g., by prompting the user to scan a ticket that identifies the location information, such as the particular venue and/or the seat using some other technique).

In some implementations, controller device 220 may direct a user of user device 210 to confirm the user device location information when multiple user devices 210 identify the same seat identifier. For example, assume that two user devices 210 identify the same seat identifier. Controller device 220 may prompt both user devices 210 to confirm respective locations by prompting each user of both user devices 210 to scan a ticket that identifies the location information for each user device 210. In some implementations, block 530 may be omitted when the location information provided by a user of user device 210 corresponds to information provided by a GPS of user device 210 and/or when a single user device identifies a particular seat identifier.

Process 500 may include identifying a particular event instruction schedule for the user device (block 540). For example, controller device 220 may identify the particular event instruction schedule for user device 210 based on the location information of user device 210, based on a date and time corresponding to a particular event at a particular venue, and/or based on information stored by data structure 400. As an example, assume that the location information of user device 210 identifies that that user device 210 is located at a particular venue (e.g., the venue "FedEx Field") and at a particular seat identifier (e.g., section 100, seat 1, row 1) at a particular date and time (e.g., Dec. 30, 2012 at 1 PM). Further, assume that data structure 400 stores a particular event instruction schedule for the user device 210 located at the venue "FedEx Field" and located at the seat having the seat identifier section 100, seat 1, row 1 on Dec. 30, 2012 at 1 PM. Given these assumptions, controller device 220 may identify the particular event instruction schedule stored by data structure 400 (e.g., based on information stored by event instruction header field 410 of data structure 400).

Process 500 may further include detecting the occurrence of an event and identifying a corresponding event instruction (block 550). For example, controller device 220 may detect the occurrence of an event identified by information stored by data structure 400 based on a time of day, based on a timing device, associated with a sports game, that identifies time-out periods for the sports game, based on manual input from an operator, based on identifying a song change at a concert, based on identifying a set change at a concert, or based on some other factor. Some examples of event occurrences are described above with respect to data structure 400. In some implementations, controller device 220 may send an alert to user device 210 at a particular time prior to the occurrence of the event. In some implementations, controller device 220 may identify the corresponding event instruction based on information stored by data structure 400.

Process 500 may also include directing the user device to execute the event instruction (block 560). For example, controller device 220 may direct user device 210 to execute the event instruction based on detecting the occurrence of the event and based on identifying the event instruction, as described above. Some examples of event instructions are described above and are described in greater detail below with respect to FIGS. 6A-6C and 7.

While a particular series of blocks has been described above with regard to FIG. 5, the operations, data flows, and/or the order of the blocks may be modified in other implementations. Further, non-dependent operations and/or data flows may be performed in parallel. As described above some or all of blocks of process 500 may be performed by one or more components of user device 210. For example, user device 210 may receive an event instruction schedule from controller device 220 and may execute a particular event instruction based on a location of user device 210 and the occurrence of an event.

Figure 6A:
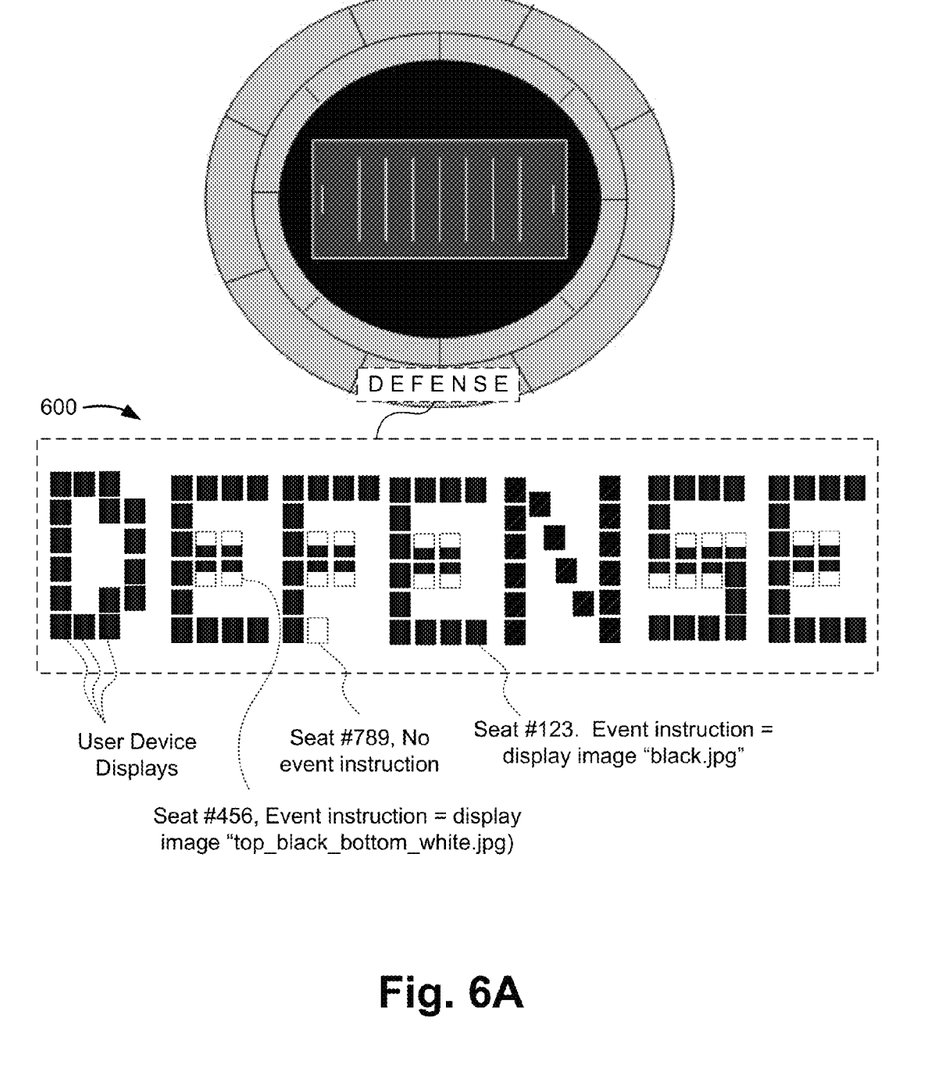
FIGS. 6A-6C and FIG. 7 illustrate example implementations as described herein.

FIGS. 6A-6C and 7 illustrate example implementations as described herein. In FIG. 6A, assume that multiple user devices 210 are oriented such that the display is fully visible from a bird's-eye view of a venue where the multiple user devices 210 are location. Further, assume that the multiple user devices 210 execute event instructions based on a respective location of each user device 210 (e.g., a location associated with a particular seat at the venue) and based on the occurrence of an event.

For example, the particular user device 210, associated with the seat identifier "seat #123," may execute an event instruction to display a particular image or color (e.g., the image "black.jpg" corresponding to an image file that causes user device 210 to display the color black in a solid pattern that fills the display). Another user device 210 (e.g., the user device 210 associated with the seat identifier "seat #456") may execute an event instruction to display another image (e.g., the image "top_black_bottom_white.jpg." corresponding to an image file that causes user device 210 to display the color black in a solid pattern at the top half of the display and display the color white in a solid pattern at the bottom half of the display). Another user device (e.g., the user device 210 associated with the seat identifier "seat #789) may not have an event instruction or may have an event instruction to display the color white in a solid pattern that fills the display.

As shown in FIG. 6A, multiple displays, associated with corresponding user devices 210, may execute event instructions to form combined display 600 such that each display of each user device 210 functions as a particular pixel or group of pixels for combined display 600. As shown in FIG. 6A, combined display 600 may display a pattern (e.g., the word "DEFENSE") when combined display 600 is viewed from a bird's-eye view and when user devices 210 execute the event instructions.

In some implementations, a representation of combined display 600 may be presented on a user interface of controller device 220 (e.g., via an application of controller device 220). For example, the user interface of controller device 220 may include a seating chart of a venue to allow an operator of controller device 220 to select an individual seat identifier and to assign an event schedule for the user device 210 located in a seat corresponding to the seat identifier. In some implementations, the application of controller device 220 and/or the event schedule may be licensed to venue operators to allow the venue operators to use controller device 220 to provide event instructions to patrons associated with user devices 210.

Figure 6B:
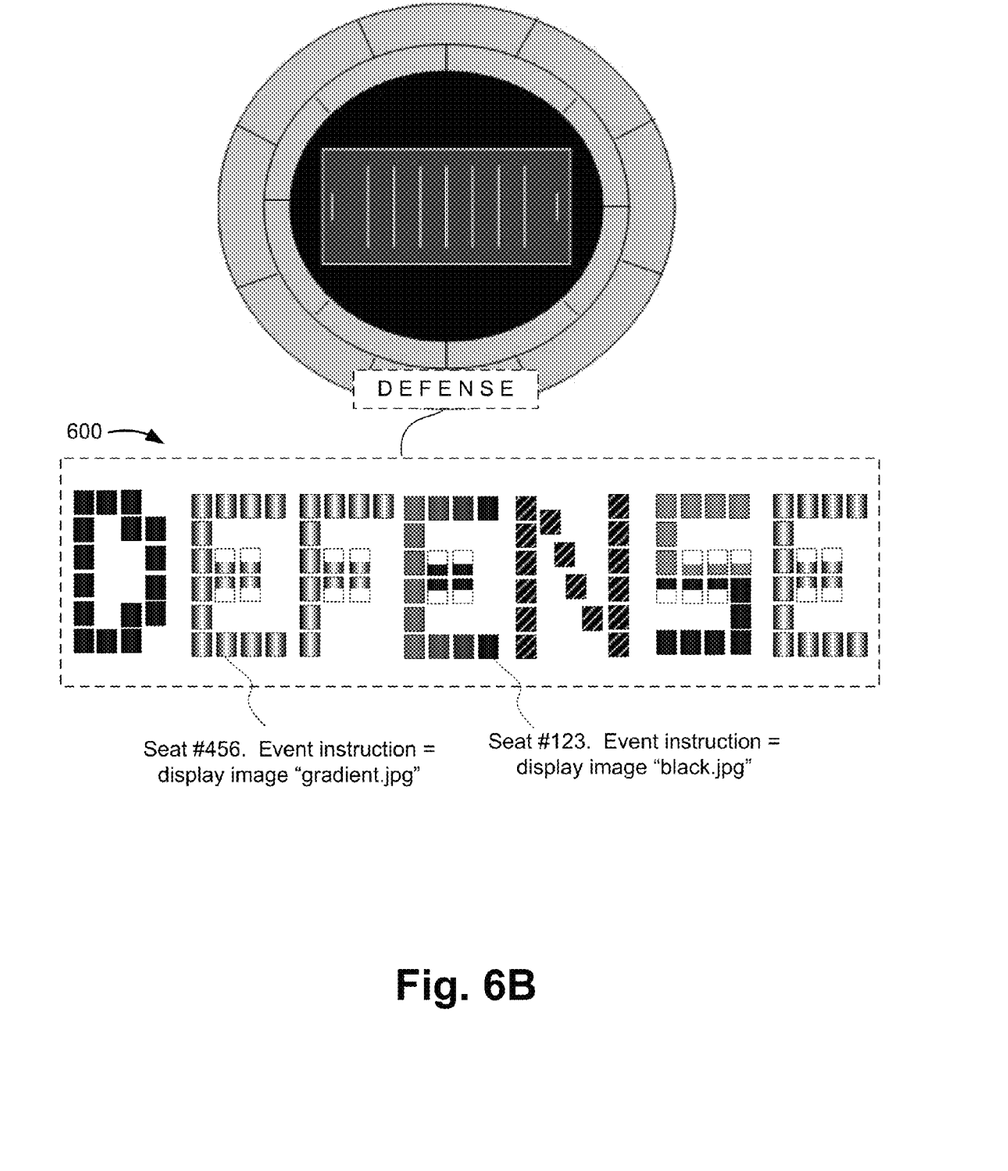

In some implementations, the event instructions may cause user device 210 to display some other image file. For example, referring to FIG. 6B, the event instruction may direct user device 210 to display an image file to cause user device 210 to display a gradient pattern that fills the display (e.g., as shown in the event instruction for the user device 210 associated with the seat identifier "seat #456"). As shown in FIG. 6B, the event instruction may direct another user device 210 associated with another seat identifier to display some other pattern.

Figure 6C:
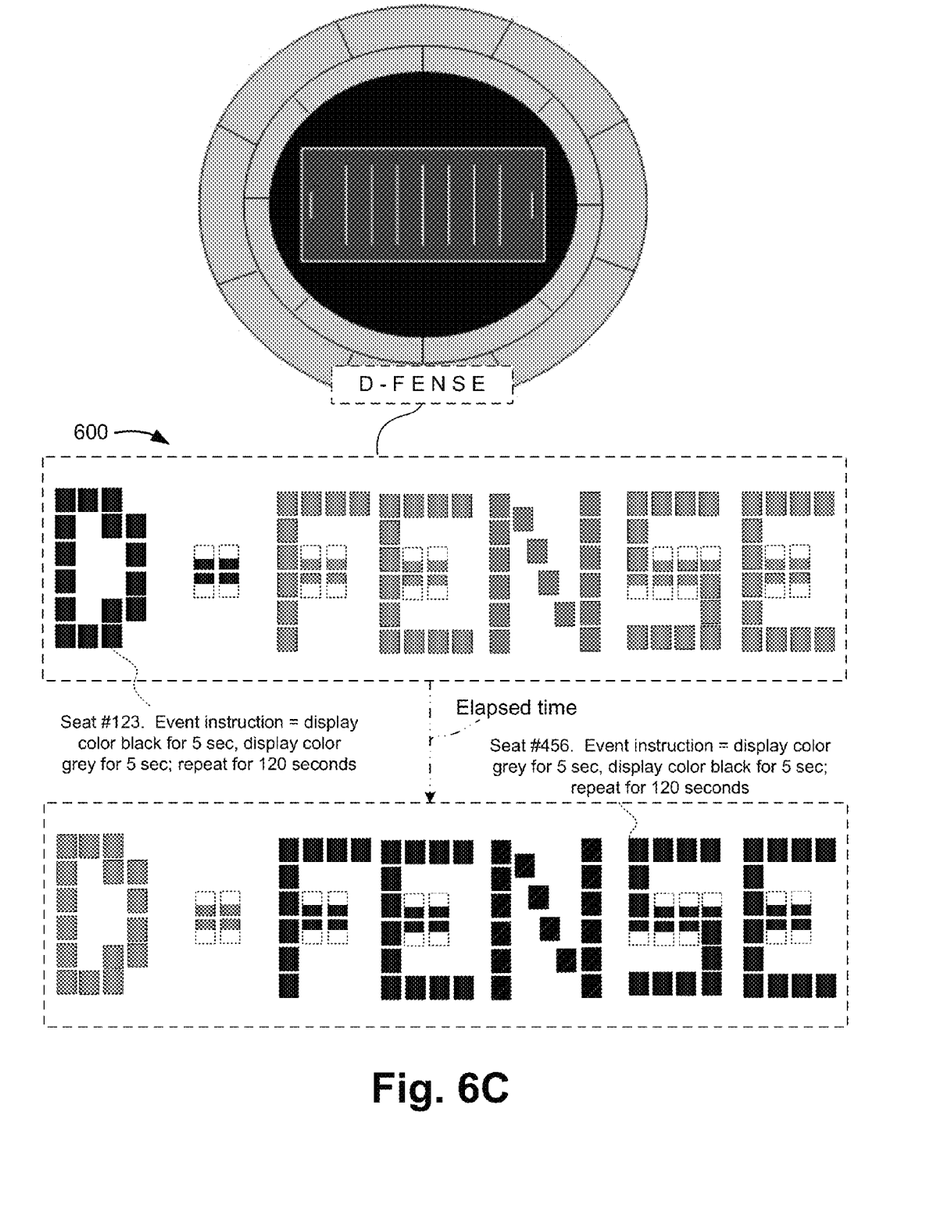

In some implementations, the event instruction may direct user device 210 to display an animation or multiple images/colors in a particular sequence. For example, referring to FIG. 6C, the event instruction may direct a particular user device 210 (e.g., the user device 210 associated with the seat identifier "seat #123") to display multiple colors in a sequence. As shown in FIG. 6C, the event instruction may direct user device 210 to first display the color black for five seconds, display the color grey for five seconds after displaying the color black, and to repeat the sequence. As further shown in FIG. 6C, the event instruction may direct another user device 210 located in a different seat to display the colors in a different sequence. For example, the user device 210 associated with the seat identifier "seat #456," may first display the color grey for five seconds, display the color black for five seconds after displaying the color grey, and to repeat the sequence. As a result, combined display 600 may display an animation when viewed from a bird's-eye view.

Figure 7:
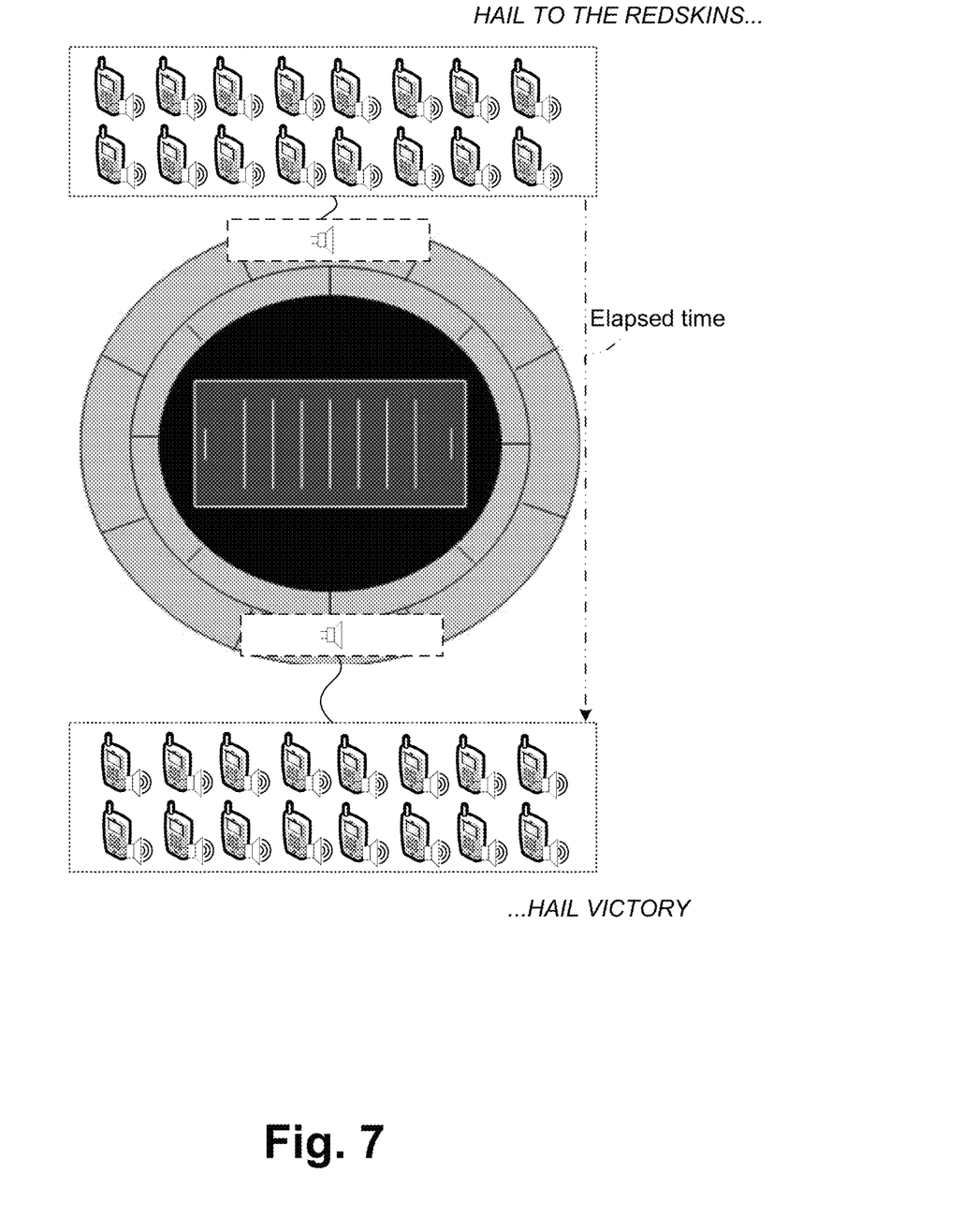

In some implementations, an event instruction may direct user device 210 to play a sound file. For example, referring to FIG. 7, event instructions may direct a first group of user devices 210, located at a first portion of a venue, to play a first sound file. The event instructions may further direct a second group of user devices 210, located at a second portion of the venue, to play a second sound file. In FIG. 7, assume that the first and second sound files are associated with a particular song having lyrics. In some implementations, the first song file (e.g., when played by the first group of user devices 210), may cause the first group of user devices 210 to play a first group of lyrics associated with the song (e.g., the lyrics "HAIL TO THE REDSKINS"). The second song file (e.g., when played by the second group of user devices 210) may cause the second group of user devices 210 to play a second group of lyrics, associated with the song (e.g., the lyrics "HAIL VICTORY"), after the first group of lyrics have been played. As a result, the event instructions may allow a group of user devices 210 to function as an interactive sound system that plays a sound file in accordance with a particular cheer or to coordinate sounds and/or lyrics for a particular song.

While particular examples are shown in FIGS. 6A-6C and 7, it will be apparent that in practice, the event instructions may direct multiple user devices 210 to form some other pattern, form some other animation, or perform some other task than what is shown in FIGS. 6A-6C and 7.

In some implementations, event instructions may cause user devices 210 to record video using camera devices of user devices 210 such that individual videos, recorded by user devices 210, may be stitched together to form a 360 degree display of a venue which may be shared, for example, via a website, such as a social networking website. In some implementations, controller device 220 may receive information identifying purchases made by a particular patron, associated with a particular user device 210, and may map the purchase to a seat identifier, associated with the patron, to link advertising to the seat identifier.

As described above, user device 210 may be used to display different portions of different patterns, thereby allowing user device 210 to function as a dynamic stunt card. For example, user device 210 may be part of a collection of multiple user devices 210 that form a combined display such that each user device 210 functions as a particular component (e.g., a particular pixel or group of pixels) of the combined display. Additionally, or alternatively, user device 210 may be part of a collection of multiple user devices 210 that form a combined sound system such that user device 210 functions as a particular component of the combined sound system. As a result, the experience of a user of user device 210 may be improved when the user attends a particular affair (e.g., a sports game, a concert, etc.).

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
    receiving, by a server device, one or more event instruction schedules,
        a particular schedule, of the one or more event instruction schedules, being associated with a particular time period and a particular location, and
        the particular schedule identifying an event, of one or more events, and identifying a particular corresponding instruction, of the instructions, corresponding to the event of the one or more events;
    receiving, by the server device, location information identifying a location of a user device;
    identifying, by the server device, the particular schedule of the one or more event instruction schedules based on the location of the user device, a current time, the particular time period, or the particular location;
    identifying, by the server device, an occurrence of the event, of the one or more events, identified by the particular schedule;
    identifying, by the server device, the particular corresponding instruction for the event based on the particular schedule; and
    directing, by the server device, the user device to execute the particular corresponding instruction based on the occurrence of the event,
        the server device causing the user device to execute the particular corresponding instruction to function as a component in a combined display or a component in a combined sound outputting system,
        the combined display or the combined sound outputting system including a plurality of user devices in addition to the user device.

2. The method of claim 1, where the particular location is associated with a venue or a seat identifier.

3. The method of claim 1, where the particular corresponding instruction causes the user device to display a color, a pattern, or a portion of a combined pattern displayed by the combined display.

4. The method of claim 1, where the particular corresponding instruction causes the user device to display a portion of an animation displayed by the combined display.

5. The method of claim 1, where the particular corresponding instruction causes the user device to output a sound.

6. The method of claim 1, where the event is a particular time, a scoring event of a sports game, a time-out period of a sports game, a song change at a concert, or a set change at a concert.

7. The method of claim 1, where the combined display is visible from a bird's eye view or an isometric view of the combined display.

8. The method of claim 1, where the one or more event instruction schedules are received from an operator or a device associated with a venue associated with the particular location.

9. The method of claim 1, where the event is identified based on a timing or scoring device associated with a venue associated with the particular location.

10. A system comprising:
a server device to:
receive one or more event instruction schedules,
a particular schedule, of the one or more event instruction schedules, being associated with a particular time period and a particular location,
the particular location being associated with a venue or a seat identifier, and
the particular schedule identifying an event, of one or more events, and identifying instructions corresponding to the event of the one or more events;
receive location information identifying a location of a user device;
identify the particular schedule of the one or more event instruction schedules based on the location of the user device, a current time, the particular time period, or the particular location;
identify an occurrence of the event of the one or more events identified by the particular schedule;
identify the particular corresponding instruction for the event based on the particular schedule; and
direct the user device to execute the particular corresponding instruction based on the occurrence of the event,
the server device causing the user device to execute the particular corresponding instruction to function as a component in a combined display or a component in a combined sound outputting system,
the combined display or the combined sound outputting system including a plurality of user devices in addition to the user device.

11. The system of claim 10, where the particular corresponding instruction causes the user device to display a color, a pattern, or a portion of a combined pattern or animation displayed by the combined display.

12. The system of claim 10, where the event is a particular time, a scoring event of a sports game, a time-out period of a sports game, a song change at a concert, or a set change at a concert.

13. The system of claim 10, where the combined display is visible from a bird's eye view or an isometric view of the combined display.

14. The system of claim 10, where, when receiving the one or more event instruction schedules, the server device is further to:
receive the one or more event instruction schedules from an operator or a device associated with a venue associated with the particular location.

15. The system of claim 10, where, when identifying the occurrence of the event, the server device is further to:
identify the occurrence of the event based on a timing or scoring device associated with a venue associated with the particular location.

16. A non-transitory computer-readable medium for storing instructions, the instructions comprising:
a plurality of instructions which, when executed by one or more processors associated with a server device, cause the one or more processors to:
receive one or more event instruction schedules,
a particular schedule, of the one or more event instruction schedules, being associated with a particular time period and a particular location, and
the particular schedule identifying an event, of the one or more events, and identifying a particular corresponding instruction, of the instructions, corresponding to the event of the one or more events;
receive location information identifying a location of a user device,
identify the particular schedule of the one or more event instruction schedules based on the location of the user device, a current time, the particular time period, or the particular location;
identify an occurrence of the event of the one or more events identified by the particular schedule; identify the particular corresponding instruction for the event based on the particular schedule; and
direct the user device to execute the particular corresponding instruction based on the occurrence of the event, the server device causing the user device to execute the particular corresponding instruction to function as a pixel in a multiple pixel display or a speaker in a multiple speaker sound outputting system, the multiple pixel display or the multiple speaker sound outputting system including a plurality of user devices in addition to the user device.

17. The non-transitory computer-readable medium of claim 16, where the particular corresponding instruction causes the user device to display a color, a pattern, or a portion of a combined pattern or animation displayed by the multiple pixel display.

18. The non-transitory computer-readable medium of claim 16, where the one of the one or more events is a particular time, a scoring event, a time-out period, a song change, or a set change.

19. The non-transitory computer-readable medium of claim 16, where one or more instructions, of the plurality of instructions, to receive the one or more schedules, further cause the one or more processors to receive the one or more schedules from an operator of the server or from a timing device associated with the one or more events.

20. The non-transitory computer-readable medium of claim 16, where one or more instructions, of the plurality of instructions, to identify the occurrence of one of the one or more events, further cause the one or more processors to identify the occurrence of the one of the one or more events based on a timing or scoring device that identifies the occurrence of the one or more events.

21. A system comprising:
a user device to:
provide information identifying a location of the user device to a server;
receive an event instruction schedule from the server;
the event instruction schedule being based on the location of the user device and a current time,
the event instruction schedule including information identifying one or more events and identifying event instructions corresponding to the one or more events;
identify an occurrence of an event of the one or more events identified by the event instruction schedule;

identify a corresponding event instruction, of the identified event instructions, for the event; and execute the corresponding event instruction based on the occurrence of the event, the user device executing the corresponding event instruction to function as a pixel in a combined display or a speaker in a combined sound outputting system, the combined display or the combined sound outputting system including at least one user device in addition to the user device.

22. The system of claim 21, where the location is associated with a venue or a seat within the venue.

23. The system of claim 21, where the corresponding event instruction causes the user device to display a color, a pattern, or a portion of a combined pattern displayed by the combined display.

24. The system of claim 21, where the corresponding event instruction causes the user device to display a portion of an animation displayed by the combined display.

25. The system of claim 21, where the corresponding event instruction causes the user device to output a sound for the combined sound outputting system.

* * * * *